(12) United States Patent
Nakaya et al.

(10) Patent No.: US 7,499,727 B2
(45) Date of Patent: Mar. 3, 2009

(54) COMMUNICATIONS APPARATUS USING ADAPTIVE ANTENNA

(75) Inventors: Yuta Nakaya, Kawasaki (JP); Takeshi Toda, Kawasaki (JP); Yasuyuki Oishi, Kawasaki (JP); Shinsuke Hara, Suita (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 10/754,815

(22) Filed: Jan. 9, 2004

(65) Prior Publication Data

US 2004/0139897 A1 Jul. 22, 2004

(30) Foreign Application Priority Data

Jan. 10, 2003 (JP) ............................. 2003-004351

(51) Int. Cl.
*H04M 1/00* (2006.01)
(52) U.S. Cl. ...................... 455/562; 375/148; 343/750; 342/368
(58) Field of Classification Search ................. 342/380, 342/383, 359, 367, 368; 455/130, 132, 133, 455/140, 143, 272, 561, 562, 450, 452.1, 455/2, 575.7, 452.2; 375/345, 144, 147, 375/148, 347; 343/749, 750, 751
See application file for complete search history.

(56) References Cited

U.S. PATENT DOCUMENTS

| 6,292,143 | B1 * | 9/2001 | Romanofsky ........ 343/700 MS |
| 6,492,942 | B1 * | 12/2002 | Kezys ......................... 342/368 |
| 6,509,872 | B2 * | 1/2003 | Ishii et al. .................... 342/383 |
| 6,552,608 | B2 * | 4/2003 | Matsuda et al. ............... 330/52 |
| 6,665,308 | B1 * | 12/2003 | Rakib et al. .................. 370/441 |
| 6,677,896 | B2 * | 1/2004 | Singer et al. ................. 342/359 |
| 6,996,383 | B2 * | 2/2006 | Hughes et al. ............. 455/138 |
| 7,006,553 | B1 * | 2/2006 | McCorkle .................... 375/130 |
| 7,075,909 | B1 * | 7/2006 | Iinuma ........................ 370/329 |
| 7,092,431 | B2 * | 8/2006 | Maeda et al. ............... 375/144 |
| 7,110,480 | B1 * | 9/2006 | Iinuma ........................ 375/347 |
| 2002/0085653 | A1 * | 7/2002 | Matsuoka et al. ........... 375/347 |

(Continued)

FOREIGN PATENT DOCUMENTS

EP          1126633         12/2000

(Continued)

OTHER PUBLICATIONS

European Search Report dated Jun. 30, 2005.

(Continued)

*Primary Examiner*—Nhan T Le
(74) *Attorney, Agent, or Firm*—Katten Muchin Rosenman LLP

(57) ABSTRACT

A communications apparatus using an adaptive antenna having in a high frequency unit an antenna unit including a plurality of antenna elements and a plurality of adjustment units, provided corresponding to the plurality of antenna elements, for adjusting directivity of an entire antenna, the communications apparatus including an interference wave element extraction unit for extracting an interference wave element other than a requested signal from a received signal by the antenna unit when an adjustment value of the adjustment unit is perturbed in a one symbol time, and an adaptive control unit for performing adaptive control on the adjustment value such that the extracted interference wave element can be minimized.

6 Claims, 16 Drawing Sheets

U.S. PATENT DOCUMENTS

2002/0190900 A1* 12/2002 Kimata et al. ............... 342/368

FOREIGN PATENT DOCUMENTS

| JP | 8-331025 | 12/1998 |
| JP | 11243358 | 9/1999 |
| JP | 11275165 | 10/1999 |
| JP | 2000357984 | 12/2000 |
| JP | 2002076747 | 3/2002 |
| JP | 2002118414 | 4/2002 |
| JP | 2002271240 | 9/2002 |

OTHER PUBLICATIONS

Stephanie L. Preston, et al. Base-Station Tracking in Mobile Communications Using a Switched Parasitic Antenna Array. IEEE Transactions on Antenna and Propagation, vol. 46, No. 6, Jun. 1998, pp. 841-844.

Jong Won Park, et al. Multiuser Detection Scheme Using Adaptive Antenna Array over Rayleigh Fading Channels. IEEE Vehicular Technology Conference, May 15, 2000, vol. 3 of 3, conf. 51, pp. 2157-2161.

Hak-Lim Ko, et al. A Switched Beamforming System with Multiuser Detectors. IEEE Vehicular Technology Conference, May 15, 2000, vol. 2 of 3, conf. 51, pp. 705-709.

Stephanie Preston, et al. Direction Finding using a switched parasitic antenna array. Antennas and Propagation Society International Symposium, Jul. 13, 1997, vol. 2, pp. 1024-1027.

Tao Luo, et al. Using Signal Cancellation for Optimum Beamforming in a Cellular CDMA System. Acoustics, Speech and Signal Processing, May 12, 1998, vol. 4, pp. 2493-2496.

A. Nishikawa, et al. A Study on OFDM Adaptive Array in Mobile Communications. Technical Report of IEICE, pp. 73-78. Mar. 2001.

A. Nishikawa, et al. OFDM Adaptive Array for Doppler Shifted Wave Suppression. Technical Report of IEICE pp. 57-62. Oct. 2000.

J. Cheng, et al. Adaptive Beamforming of ESPAR Antenna Based on Steepest Gradient Algorithm. IEICE Trans. Commun. vol. E84-B, No. 7 pp. 1790-1800 Jul. 2001.

Notice of Reason for Rejection with translation, dated Dec. 25, 2007, for the corresponding Japanese Patent Application JP 2003-004351.

* cited by examiner

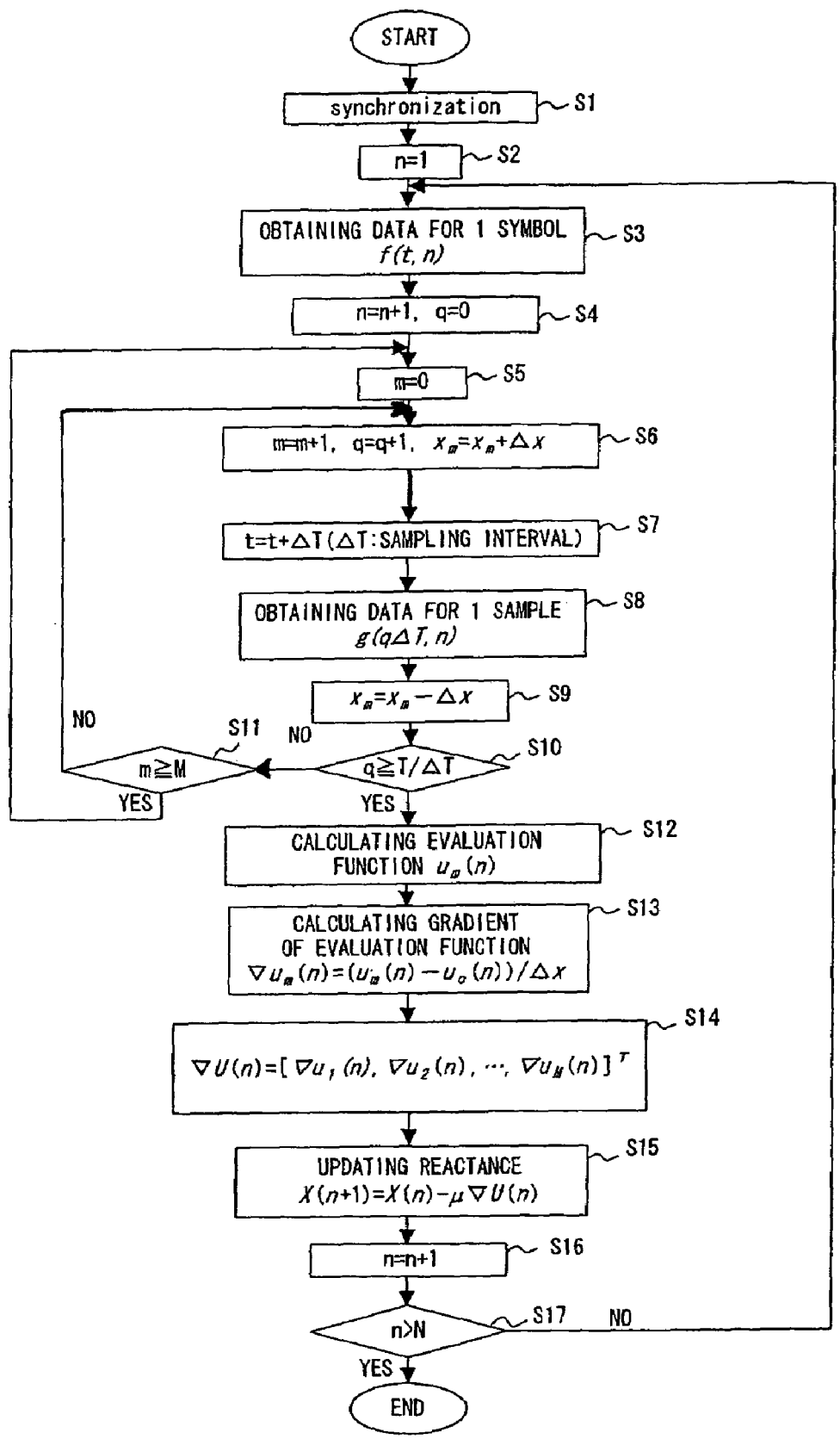
F I G. 1 0

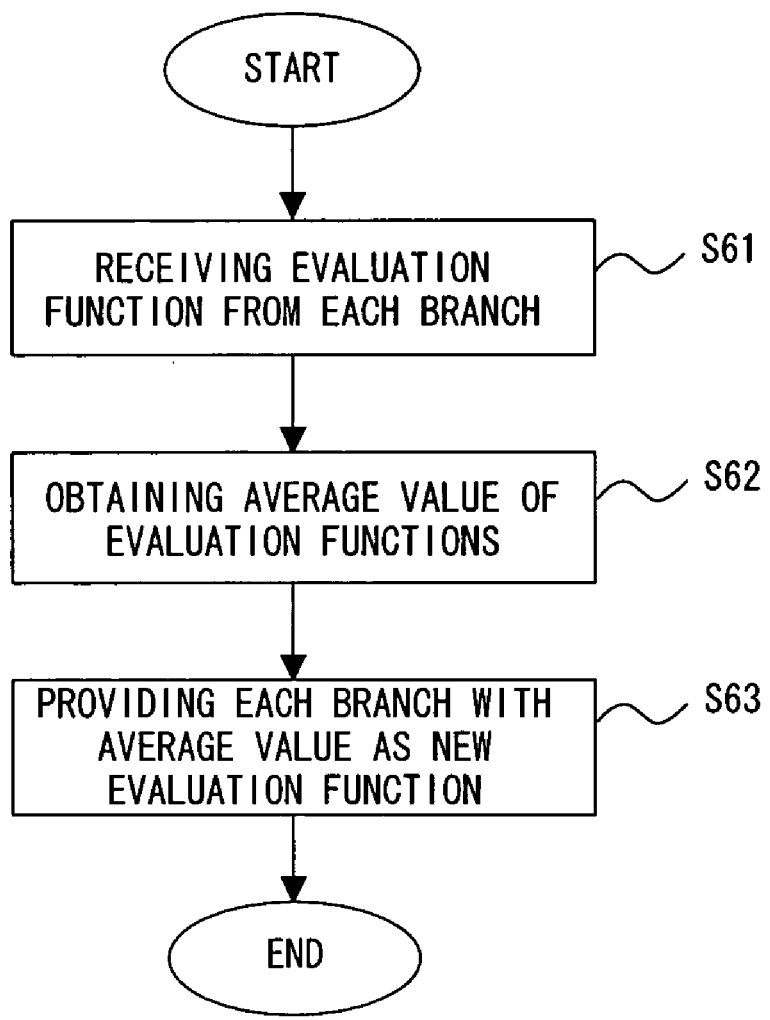
F I G. 16

COMMUNICATIONS APPARATUS USING ADAPTIVE ANTENNA

BACKGROUND OF THE INVENTION

1. Field of the Invention

The present invention relates to a wireless communications system, and more specifically to an adaptive antenna control technology in a wireless communications system for use in an environment in which communications by other systems are also established, and a mobile communications system in which high-speed and high-quality data communications are required.

2. Description of the Related Art

In a wireless communications system such as a wireless LAN system, etc., a communications system such as Bluetooth, etc. is commonly available by a number of users. Such an efficient communications system can be a multiple access system. This multiple access system is widely used as a mobile communications system.

In a wireless communications system in which a transmission data sequence is converted in parallel into a plurality of data sequences, and a plurality of parallel data sequences are transmitted in parallel by wireless using a plurality of carriers having different frequencies, for example, an OFDM (orthogonal frequency division-multiplexing) system, different pieces of information can be transmitted using a plurality of carriers. Additionally, since each subcarrier is low in transmission speed, it is not subject to frequency selective fading, and is resistant to a delay by inserting a guard interval as the same data as those coming later in time. Therefore, it is suitable for a wireless communications system in the future. However, when it receives a wave exceeding a guard interval, an interference wave from another system, and an interference wave with a Doppler shift, the properties of the system can be exceedingly degraded.

There are the following conventional technologies to prevent the degradation of properties due to the above-mentioned interference waves Patent Literature 1

Japanese Patent Application Laid-open No. 8-331025 "Adaptive Interference Cancellation Receiver"

Literature 1 of Unpatented Case

J. CHENG, et al. "Adaptive Beamforming of ESPAR Antenna Based on Steepest Gradient Algorithm IEICE Trans. COMMUN., E84-B, 7, 2001."

The Patent Literature 1 discloses an adaptive interference cancellation communication apparatus including a unit, provided for each of a plurality of reception antenna, for weighting a received signal, and a unit for composing a weighted signal.

The Literature 1 of the Unpatented Case discloses an adaptive beam forming technology using the steepest gradient algorithm in the adaptive antenna in which each antenna element has a load reactance.

The conventional technology of the interference wave suppression system for suppressing the reception of the above-mentioned interference waves is described below in more detail by referring to FIGS. 1 through 4. Normally, it is effective to adjust the length of an antenna element so as to change the directivity of an antenna. A desired wave to be received can be received by adjusting the length of an antenna element, and the directivity of an antenna can be controlled not to receive an interference wave.

However, it is actually difficult to mechanically change the length of an antenna element. In the adaptive antenna system, the directivity is changed using a method different from the above-mentioned method so that the null of the directivity of an antenna can be controlled to face an interference wave.

FIG. 1 shows an adaptive control system which is an adaptive antenna system for changing the directivity by changing a weight value by providing a weight unit which weights signals from a plurality of antenna elements and a composing circuit which composes a weighted signal, and in which the weighting process is referred to as digital beam forming performed in a processing area of a digital signal.

A signal from each antenna element 51 is converted into a digital signal by an A/D converter 53 through a high frequency front end (RF F/E) 52, for example, a mixer and a band pass filter, weighted by a weight unit 54, and then composed by a composing circuit 55. The weight value by each weight unit 54 is controlled by a weight control circuit 56. The weight control circuit 56 controls a weight value such that the interference-to-noise ratio (INR) in the output signal of the composing circuit 55 can be decreased to face the null of the directivity of an antenna to an interference wave.

In the system shown in FIG. 1, the high frequency front end 52, the A/D converter 53, etc. are required for each antenna element, thereby upsizing the entire circuit, and increasing the power consumption. To solve this problem, an adaptive control system shown in FIG. 2 can be useful in downsizing the circuit and reducing the power consumption. In FIG. 2, a weight unit 62 for weighting a signal from an antenna element 61 is provided in a high frequency area, and after a weighted signal is added by an addition circuit 63, it is supplied to a high frequency front end 65. The output of the high frequency front end 65 is converted into a digital signal by an A/D converter 66. Using the signal, a weight control unit 64 controls a weight value of each weight unit 62, thereby performing adaptive control on an antenna.

FIG. 3 shows the system of performing adaptive control by changing a variable reactance value as a load of a no-feed antenna element in the antenna elements instead of changing the weight value for a signal from an antenna element. In FIG. 3, a signal from a feed antenna element 71 is converted into a digital signal by an A/D converter 76 through a high frequency front end 75.

A variable reactance circuit 73 is connected as a load to each no-feed element 72. Using the output of the A/D converter 76, the directivity of the entire antenna can be changed by a variable reactance control unit 74 changing the variable reactance value of each variable reactance circuit 73.

The output signal of the feed antenna element 71 receives the influence of each other combined electromagnetic fields of the surrounding no feed elements 72, and the null of the directivity of an antenna can face an interference wave by the adaptive control of the variable reactance value.

For example, when an adaptive antenna is controlled in the OFDM wireless communications system using the system shown in FIG. 3, a carrier not practically used in the actual communications in a number of carriers, that is, a virtual subcarrier element, is observed, the reactance values of all no-feed elements are perturbed, and the operation of updating a variable reactance value is repeated such that the interference-to-noise ratio can be reduced, thereby performing the adaptive control on an antenna.

FIG. 4 is an explanatory view of the conventional technology of the perturbation system in the above-mentioned adaptive control. In FIG. 4, continued is the operation in which the variable reactance value for the first elements 1 in the variable reactance values corresponding to a plurality of no-feed elements is perturbed in the first symbol, the variable reactance value for the element 2 is perturbed in the next symbol, and the variable reactance value for the element 3 is perturbed in the third symbol.

That is, in the system shown in FIG. 4, when there are M no-feed antenna elements, an M-symbol time is required to perturb them, and also 1-symbol unperturbed data is required for evaluation of perturbation. Therefore, a total of M+1 symbol time is required to update the variable reactance value of the antenna.

SUMMARY OF THE INVENTION

The present invention aims at providing a communications apparatus capable of perturbing a variable reactance value for a no-feed element or a weight value for an antenna element within one symbol time, and updating the variable reactance value or the weight value in one symbol, thereby quickly performing control on an adaptive antenna, and also capable of downsizing an entire circuit, realizing a light circuit, reducing power consumption and necessary cost. The communications apparatus is based on providing in a high frequency unit an antenna unit including a plurality of antenna elements, a plurality of adjustment units for adjusting the directivity of the entire antenna corresponding to the respective antenna elements, and also includes an interference wave element extraction unit for extracting an interference wave element other than a desired signal to be received by the communications apparatus from a received signal of the antenna unit when an adjustment value of the adjustment unit is perturbed within a 1-symbol time used in the communications apparatus, and an adaptive control unit for performing adaptive control on the adjustment value such that the extracted interference wave element can be minimized.

BRIEF DESCRIPTION OF THE DRAWINGS

FIG. 10 is a flowchart of the reactance control process according to the first embodiment of the present invention;

FIG. 16 is a flowchart of the process of the control of the cooperation between the branches shown in FIG. 15.

DESCRIPTION OF THE PREFERRED EMBODIMENTS

Figure 5:
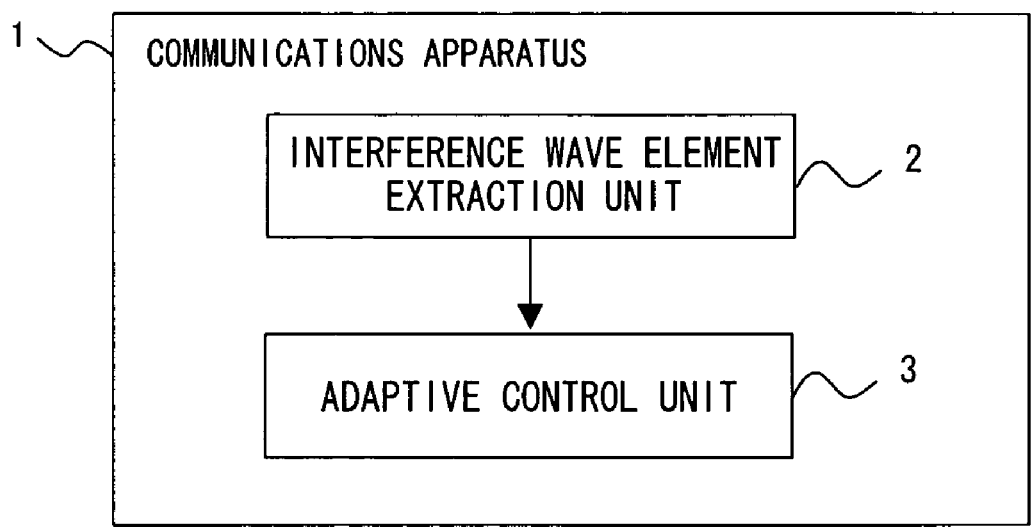
FIG. 5 is a block diagram of the configuration showing the principle of the interference wave suppression system according to an embodiment of the present invention.

The embodiments according to the present invention are described below in detail by referring to the attached drawings. FIG. 5 is a block diagram of the configuration showing the principle of the communications apparatus using an adaptive antenna according to an embodiment of the present invention. FIG. 5 is a block diagram of the configuration of a communications apparatus 1 comprising in a high frequency unit an antenna unit having a feed antenna element and, in the vicinity of the feed antenna element, that is, within a distance of a sufficient level of fading correlation, one or more no-feed antenna elements to each of which variable reactance is connected. The communications apparatus 1 comprises at least an interference wave element extraction unit 2 and an adaptive control unit 3.

The interference wave element extraction unit 2 extracts an interference wave element other than a desired signal to be received by the communications apparatus 1 from a digitized signal of a signal from an antenna unit when a variable reactance value of a variable reactance connected to a no-feed antenna element is perturbed in a 1-symbol time used in the communications apparatus 1, and the adaptive control unit 3 performs adaptive control for a variable reactance value in a steepest gradient method such that the extracted interference wave element can be minimized.

Figure 1:
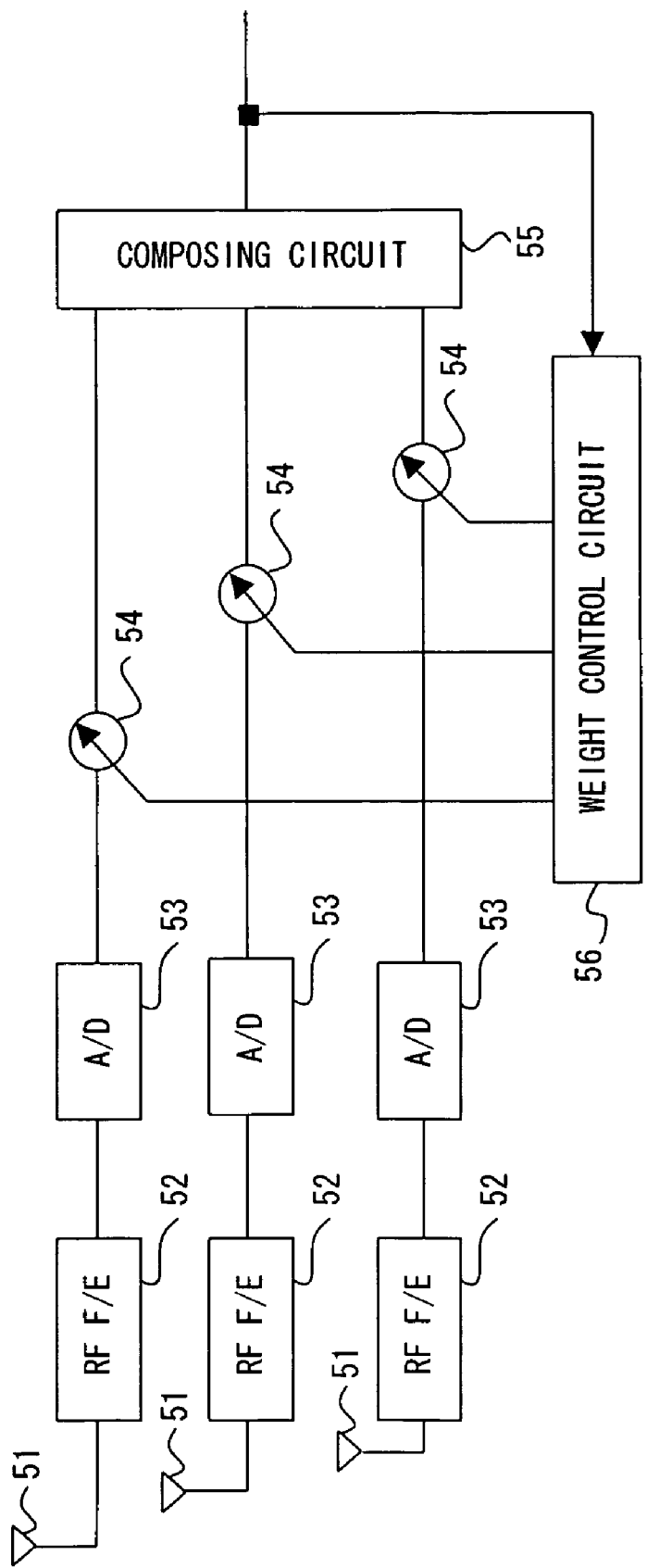
FIG. 1 is a block diagram of the configuration of the conventional technology (1) of the interference wave suppression system.
Figure 2:
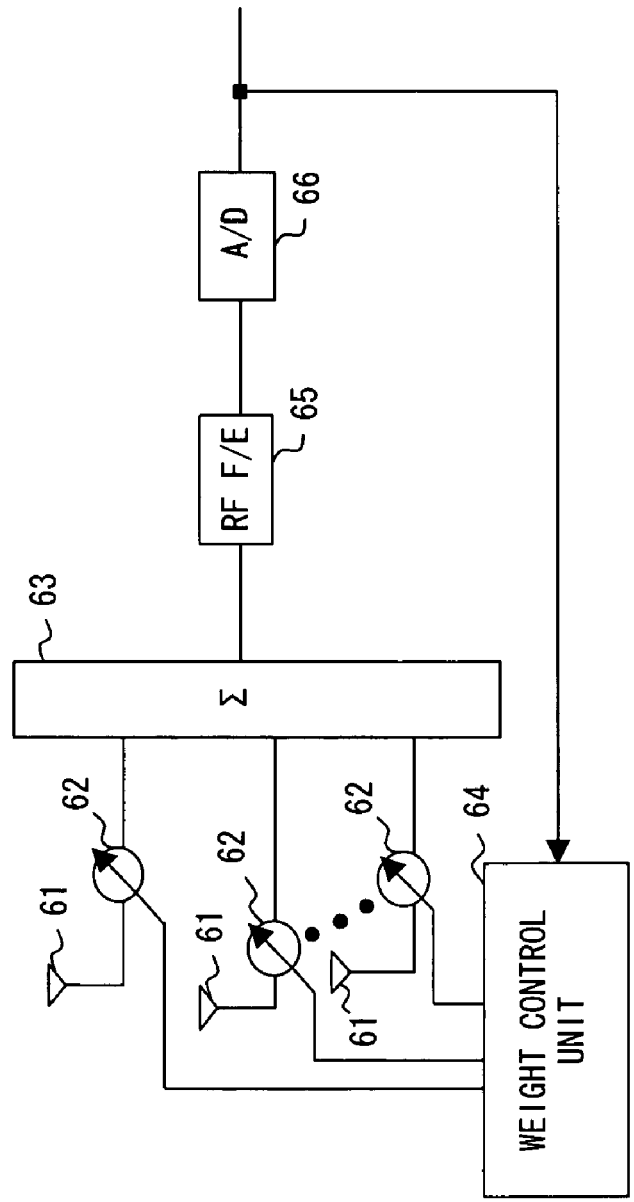
FIG. 2 is a block diagram of the configuration of the conventional technology (2) of the interference wave suppression system.
Figure 3:
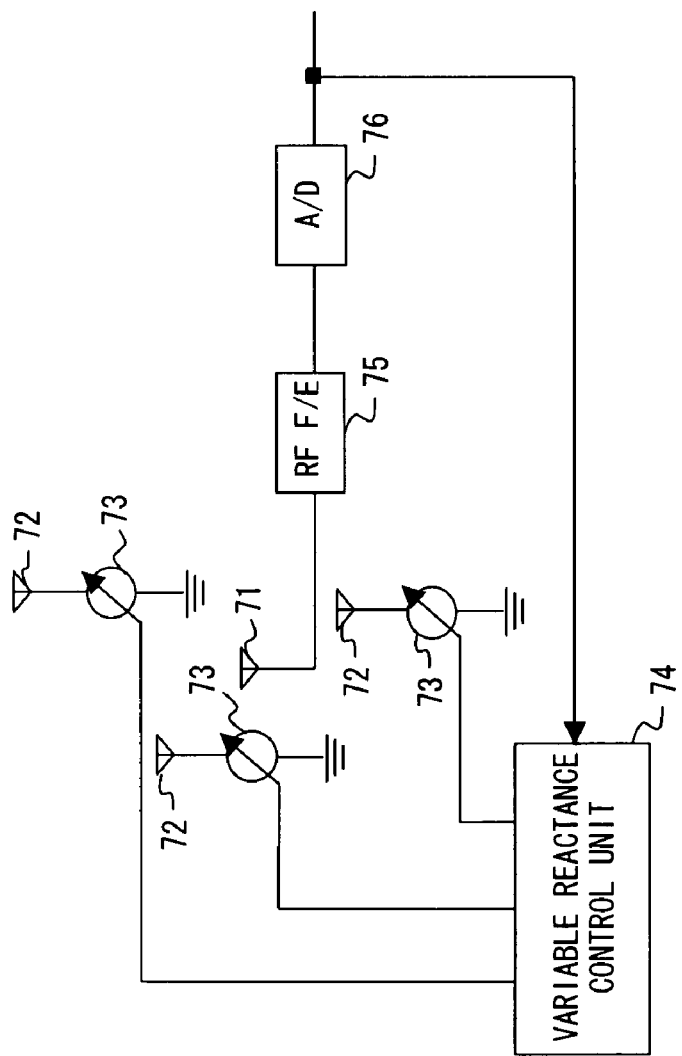
FIG. 3 is a block diagram of the configuration of the conventional technology (3) of the interference wave suppression system.
Figure 4:
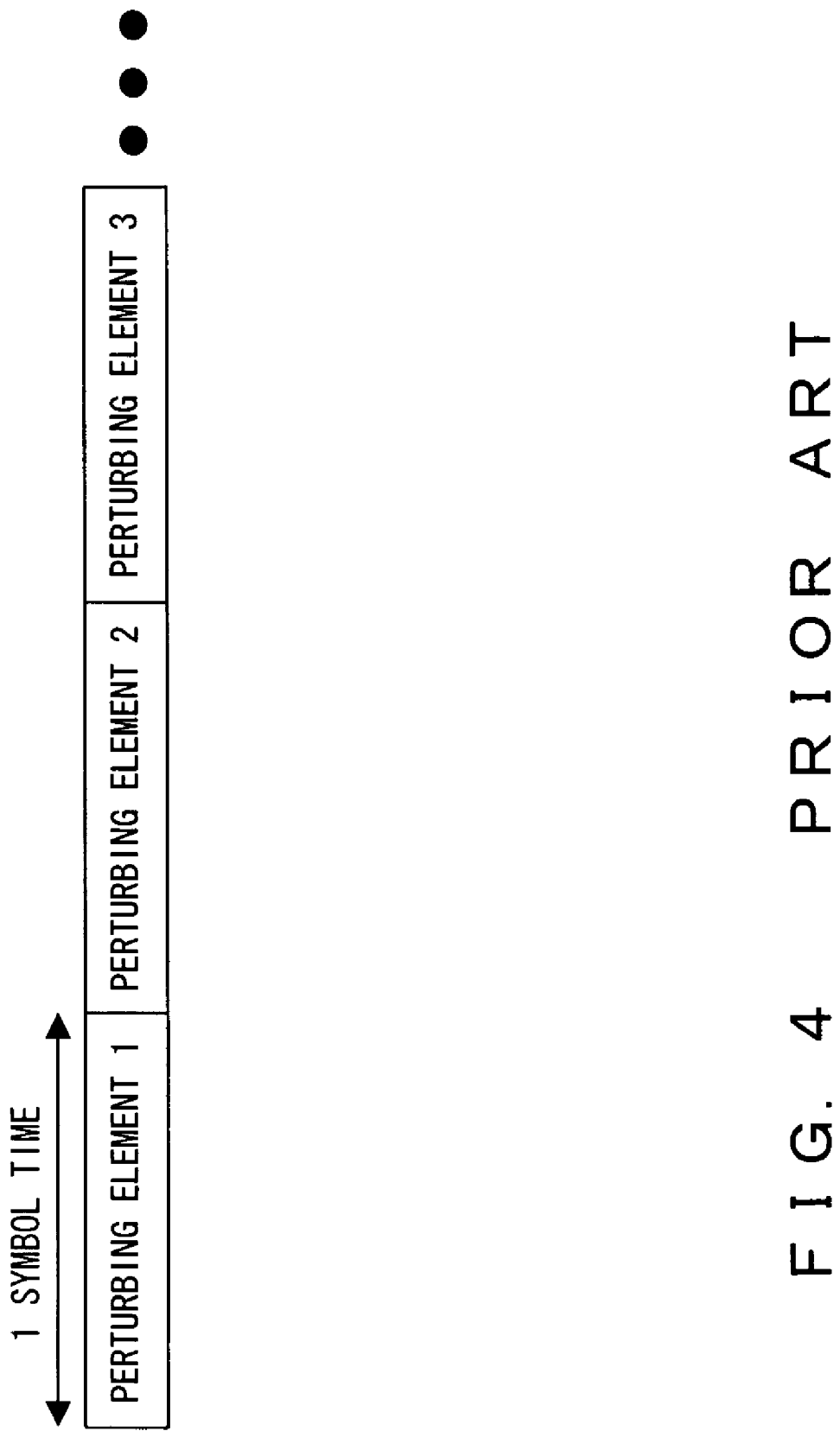
FIG. 4 is an explanatory view of the conventional technology of the perturbation system.

Another communications apparatus 1 according to an embodiment of the present invention comprises in a high frequency unit an antenna unit comprising a plurality of antenna elements each having a weight unit and a composing circuit unit for composing a weighted signal from each of the antenna elements, and also an interference wave element extraction unit 2 and an adaptive control unit 3 as in FIG. 1.

In this case, the interference wave element extraction unit 2 extracts an interference wave element other than a desired signal from a signal after the digitization of a signal from the antenna unit when a weight value of the weight unit provided for each of the plurality of antenna elements is perturbed within a 1-symbol time used in the communications apparatus 1, and the adaptive control unit 3 performs adaptive control on a weight value such that the interference wave element can be minimized.

According to an embodiment of the present invention, the communications apparatus 1 converts a sequence of transmission data into a parallel data sequence, and transmits by wireless in parallel each of the converted data sequences by a plurality of carriers having different frequencies, and the interference wave element extraction unit 2 can extract as an interference wave element a virtual subcarrier element as a carrier not used in data transmission in a plurality of carriers. In this case, the interference wave element extraction unit 2 can extract the virtual subcarrier element using a Fourier transform or a Wavelet transform.

According to the embodiment, the interference wave element extraction unit 2 can also extract an interference wave element using received data obtained without perturbing each of the variable reactance or the weight value of the weight unit in a symbol of two symbols, and received data obtained by perturbing the variable reactance or the weight value in the other symbol. In this case, in the other symbol, the received data can be obtained by repeating the perturbation of the variable reactance values or weight value for a plurality of antenna elements in each sample, or the received data can be obtained by continuously perturbing a plurality of variable reactance values or weight values sequentially for a plurality of.

In the embodiment, the interference wave element extraction unit 2 can also extract an interference wave element using received data obtained by perturbing the variable reactance corresponding to a plurality of antenna elements or the weight value of the weight unit in a symbol time, and obtained for a period in which any variable reactance or weight value is not perturbed.

Also in the embodiment, the communications apparatus 1 can comprise a plurality of diversity branches each comprising an antenna unit and corresponding interference wave element extraction unit and adaptive control unit, a weight unit for each diversity branch, and a composing circuit unit for composing a weighted signal from each of the diversity branches. In this case, the adaptive control unit of each diversity branch can independently perform adaptive control on each antenna unit, or perform adaptive control in cooperation.

Furthermore, in the embodiment, the variable reactance value corresponding to an element other than a specific element can be maximized or a weight value can be adjusted to control the influence of variable reactance corresponding to a specific element in a plurality of antenna elements or a weight value.

The embodiment of the present invention is described below by referring to a practical example and attached drawings.

Figure 6:
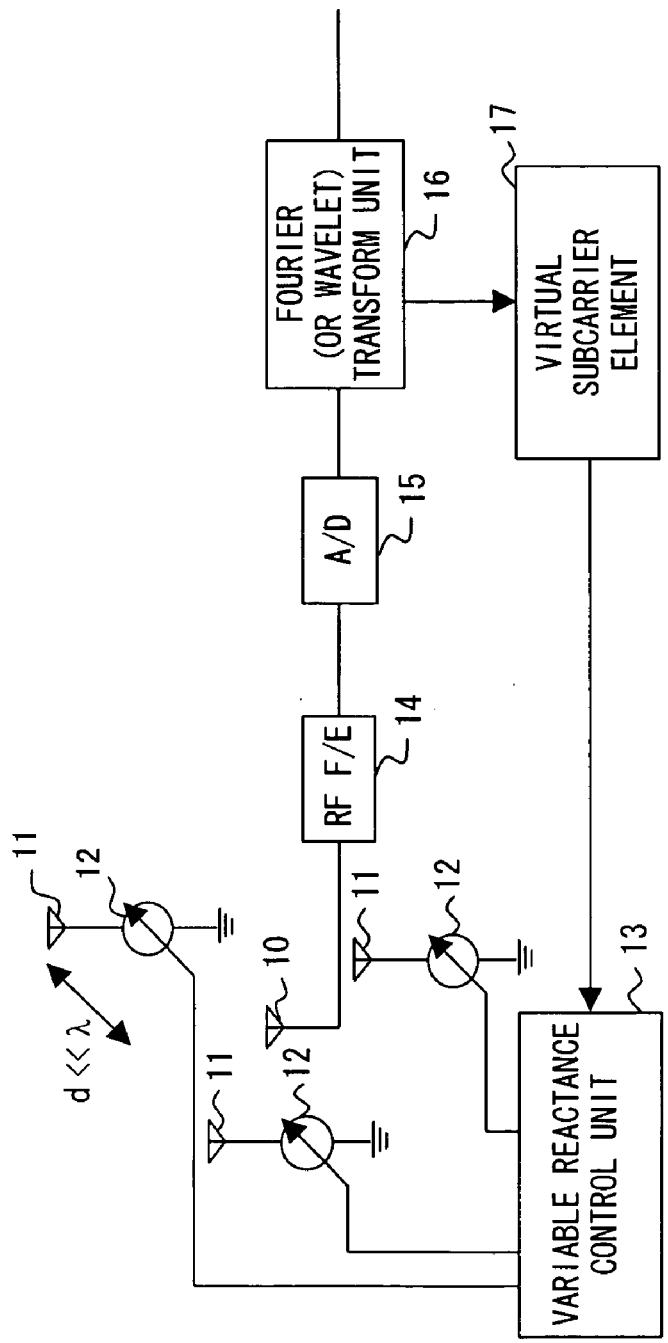
FIG. 6 is a block diagram of an example (1) of the basic configuration of the interference wave suppression system according to an embodiment of the present invention.
Figure 7:
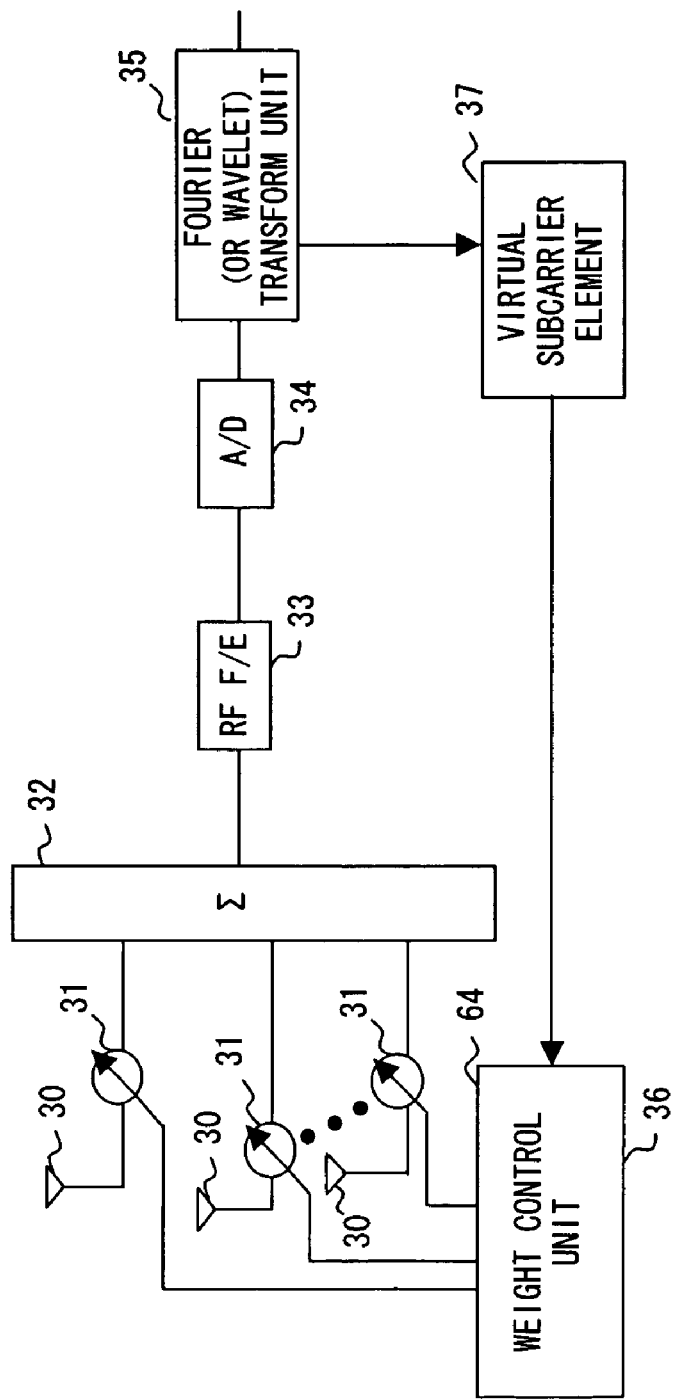
FIG. 7 is a block diagram of an example (2) of the basic configuration of the interference wave suppression system according to an embodiment of the present invention.

FIGS. 6 and 7 are block diagrams of the basic configuration in the interference wave suppression system according to the present invention.

In FIG. 6, a signal from a feed antenna element 10 is input as a digitized signal to a Fourier transform unit 16 through a high frequency front end (RF F/E) 14 and an AD converter 15.

The variable reactance circuit 12 is connected to each of a plurality of no-feed antenna elements 11 shown in FIG. 6, and the variable reactance value is controlled by a variable reactance control unit 13.

In the embodiment shown in FIG. 6, a carrier not practically used in the practical communications, that is, a virtual subcarrier element 17, is extracted by the Fourier transform unit 16, and the element is supplied to the variable reactance control unit 13, thereby controlling each variable reactance value such that the INR can be minimized.

In FIG. 7, a weight unit 31 weights an input signal from an antenna element 30, an addition circuit 32 adds the weighted signal, and the added signal is input to a Fourier transform unit 35 as a digitized signal through a high frequency front end (RF F/E) 33 and an AD converter 34.

The weight value is controlled by a weight control unit 36.

In the embodiment shown in FIG. 7, a carrier not practically used in the practical communications, that is, a virtual subcarrier element 37, is extracted by the Fourier transform unit 35, and the element is supplied to the weight control unit 36, thereby controlling each weight value such that the INR can be minimized.

In the embodiment shown in FIGS. 6 and 7, the Fourier transform units 16 and 35 can be replaced with a Wavelet transform unit for performing a Wavelet transform. With the configuration including the Wavelet transform unit, the following system and configuration can also be applied.

Described below in detail is a space beam forming system for allowing the null of the directivity of an antenna to face an interference wave such that the interference-to-noise ratio (INR) with the digitized signal can be minimized.

The space beam forming system described below is embodied by controlling the variable reactance value of the variable reactance circuit 12 in the embodiment shown in FIG. 6, and is embodied by controlling the weight value of the weight unit 31 in the embodiment shown in FIG. 7. Since the explanation of the system can be commonly described using one of the embodiments, the embodiment shown in FIG. 6 is used in the following explanation.

Figure 8:
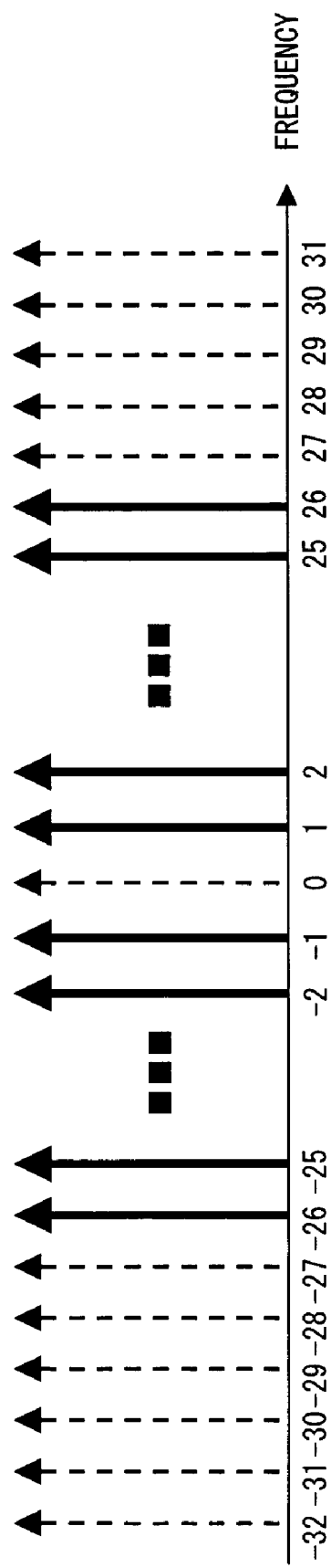
FIG. 8 shows an example of arranging a subcarrier.

FIG. 8 shows an example of arranging a subcarrier for explanation of the embodiment of the present invention. In this example, a wireless communications system in which a transmission data sequence is converted into a plurality of data sequences in parallel, and the plurality of data sequences are transmitted in parallel by wireless using a plurality of carriers having different frequencies, for example, an OFDM (orthogonal frequency division multiplexing) system, is used. For example, a frame format in accordance with IEEE802.11a is used.

In FIG. 8, the carrier indicated by a dotted line is a carrier practically not used in communications, and a carrier indicated by solid line is used in communications. In this example, 52 carriers are used in the communications.

Figure 9:
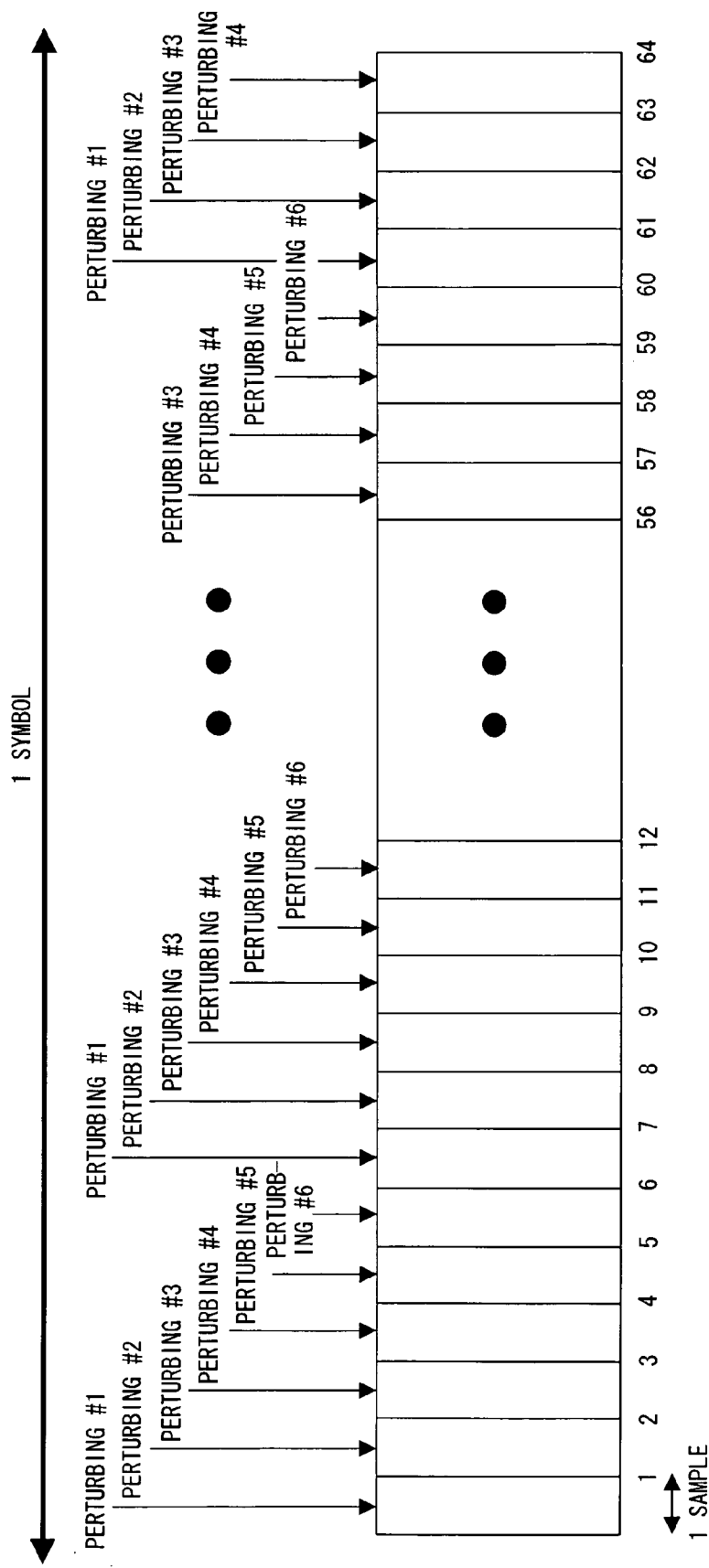
FIG. 9 shows the perturbation system according to the first embodiment of the present invention.

FIG. 9 shows the reactance perturbation system according to the first embodiment of the present invention. FIG. 10 is a flowchart of the reactance control process according to the first embodiment of the present invention. In the present embodiment, the element of a carrier not practically used in the communications as described above, that is, the virtual subcarrier element, is minimized, thereby suppressing the interference wave. The embodiment is explained by assuming that the number of no-feed antenna element 11 shown in FIG. 6 in controlling the reactance based on the space beam forming system to perform the adaptive control on the antenna unit in the high frequency unit is 6 (no-feed antenna elements #1 through #6).

In the perturbation system shown in FIG. 9, the variable reactance value in the variable reactance circuit 12 shown in FIG. 6 is quantitatively perturbed by relative to one no-feed antenna element per sample in the order of the no-feed antenna elements #1 through #6. After the perturbation of the no-feed antenna element #6, the perturbation is returned to the no-feed antenna element #1. By repeating the above-mentioned operation, data of 64 samples is obtained in one symbol.

When the process is started in FIG. 10, the OFMD signal is received in step S1, and the synchronization is established. In step S2, the value n indicating the number of trial processes (when the process is performed on the received signal continuously in time, the value corresponds to the number of symbols) is set to 1.

Then, in step S3, the data f (t, n) of one symbol is obtained. The data of one symbol is not the data obtained when the variable reactance value is perturbed as explained by referring to FIG. 9, but the raw data received when variable reactance is not controlled. The time t is incremented by each sample in one symbol when data is obtained.

In step S4, the number n of trial processes is incremented, and the value of q indicating the relative position of a sample in one symbol is initialized to 0. In step S5, the value of m indicating the order of the perturbation of no-feed antenna elements is set to 0.

Then, in steps S6 through S11, the data is obtained by the case that the variable reactance value is perturbed relative to each no-feed antenna element as explained by referring to FIG. 9. First, in step S6, the value "m" indicating the perturbation order of the no-feed antenna elements, and the value "q" indicating the relative position of the sample in one symbol are incremented, and the reactance value "xm" corresponding to the no-feed antenna element specified by "m" is increased (perturbed) by Δx, and the value of the time t is incremented by the sampling interval ΔT in step S7.

The data of one sample specified by the value of q is obtained in step S8. The data is expressed by the function of the absolute position qΔT of a sample and the number n of trial processes in one symbol. Then, in step S9, the value of the variable reactance value xm is returned to the original value. In step S10, it is determined whether or not the value "q" indicating the relative position of the sample has reached or exceeded T/ΔT. In this expression, T indicates the time of one symbol, and T/ΔT indicates 64 in FIG. 9, that is, the relative position of the last sample of one symbol. If it is determined that q has not reached the value, then it is determined in step S11 that "m", that is, the variable indicating the perturbation order of no-feed antenna elements, is equal to or larger than "M", that is, the sum of no-feed antenna elements. If the process is performed only on the first sample shown in FIG. 9, the processes in and after step S6 are repeated.

If it is determined in step S11 that m has reached M, that is, each time it is determined that the data up to the relative position of the sample indicated by a multiple of 6 shown in FIG. 9 has been obtained, control is returned to step S5, the value of m is set to 0, and the processes after step S6 are repeated.

If it is determined in step S10 that the value of q has exceeded T/ΔT, that is, data g (t, n) of one symbol has been obtained, then the calculation of an evaluation function is performed in step S12.

In the calculation of an evaluation function, the data obtained when each antenna element is perturbed as explained above by referring to FIG. 9 is replaced with the data obtained when all no-feed antenna elements are not perturbed in step S3. That is, when the evaluation function $u_1(n)$ for evaluation of the influence of the perturbation of the first no-feed antenna element is obtained, all data of f(t, n) obtained in step S3 excluding the data for the sample with the no-feed antenna element #1 perturbed as explained by referring to FIG. 9 replaces the data obtained when each of the above-mentioned antenna elements is perturbed. As a result, function $h_l$ (t, n) shown below is obtained.

$$h_1(i\Delta T, n) = \begin{cases} f(i\Delta T, n), (i \neq 1, 7, 13, \ldots, 61) \\ g(i\Delta T, n), (i = 1, 7, 13, \ldots, 61) \end{cases}$$ [equation 1]

Then the evaluation function is extracted as a virtual subcarrier element by the following equation.

$$u_1(n) = \sum_{i=1}^{64} h_1(i\Delta T, n)e^{\frac{-j2\pi f_v i}{64}}$$ [equation 2]

where $f_v$ indicates the frequency of a virtual subcarrier.

Similarly, each of the evaluation functions $u_2(n), \ldots, u_6(n)$ relative to the influence of the perturbation of each no-feed antenna element is extracted for the second through sixth no-feed antenna elements using the functions $h_2(t, n)$~$h_6(t, n)$ whose data has been replaced as described above.

Then, in step S13, the gradient of the evaluation function is calculated. The calculation is performed by the following equation.

$$\nabla u_m(n) = \frac{u_m(n) - u_0(n)}{\Delta x}, (m = 1, 2, \ldots, 6)$$ [equation 3]

where $u_0$ (n) is defined by the following equation. In the equation above, ∇ is similar to the vector differentiation operator nabla, but simply indicates the gradient in this equation.

$$u_0(n) = \sum_{i=1}^{64} f(i\Delta T, n)e^{\frac{-j2\pi f_v i}{64}}$$ [equation 4]

Then, in step S14, the matrix indicating the gradient of the evaluation function is defined by the following equation. In this equation, T indicates displacement.

$$\nabla U(n) = [\nabla u_1(n), \nabla u_2(n), \ldots, \nabla u_6(n)]^T$$ [equation 5]

Similarly, the matrix X (n) indicating the reactance of the no-feed antenna element is defined by the following equation.

$$X(n) = [x_1(n), x_2(n), \ldots, x_6(n)]^T$$ [equation 6]

In step S15, the reactance is updated. μ indicates a step size.

$$X(n+1) = X(n) - \mu \nabla U(n)$$ [equation 7]

In step S16, the value of n is incremented. In step S17, it is determined whether or not the value of n has exceeded the maximum value N of the trial processes. If not, the processes in and after step S3 are repeated, thereby performing the adaptive control in the steepest gradient method.

In the above-mentioned processes, the perturbation is evaluated and the variable reactance is updated for the symbol in which no variable reactance is perturbed and the symbol in which variable reactance is perturbed. In the OFDM of a wireless LAN, 1 symbol is 4 μs, and the variable reactance is electrically updated. Therefore, the update time can be ignored.

Figure 11:
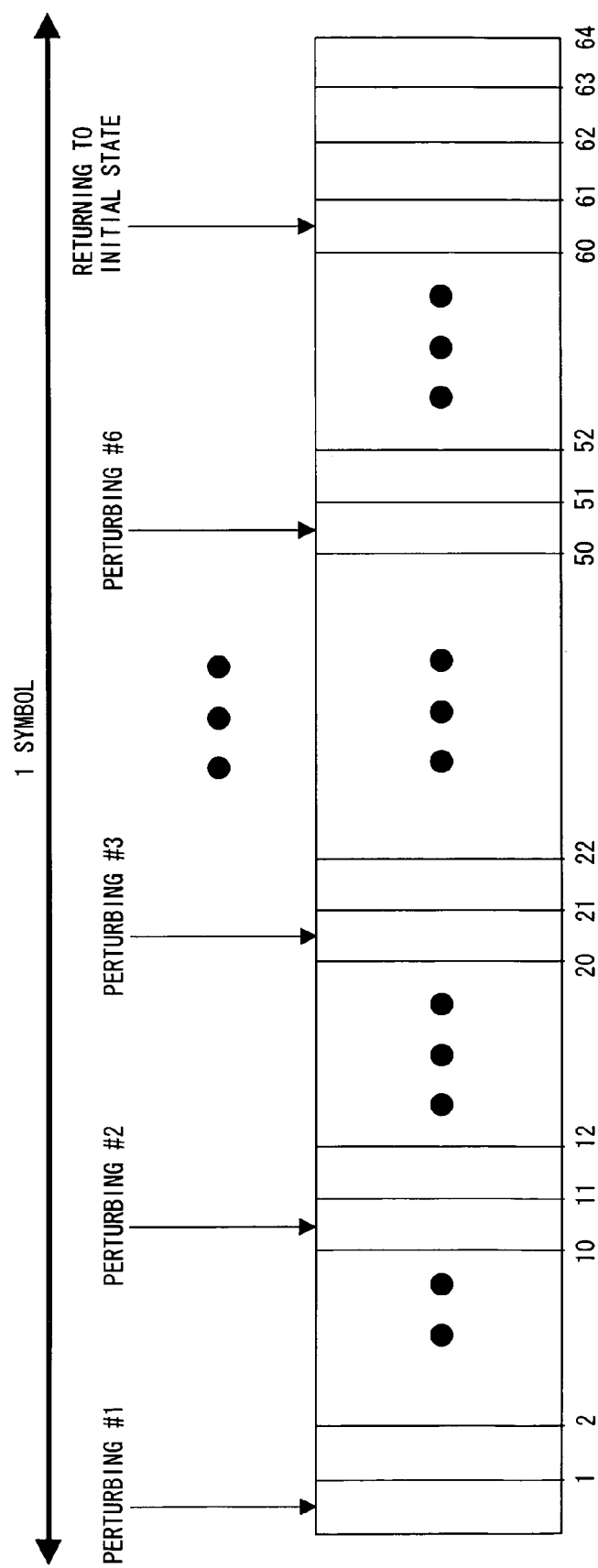
FIG. 11 shows the perturbation system according to the second embodiment of the present invention.
Figure 12:
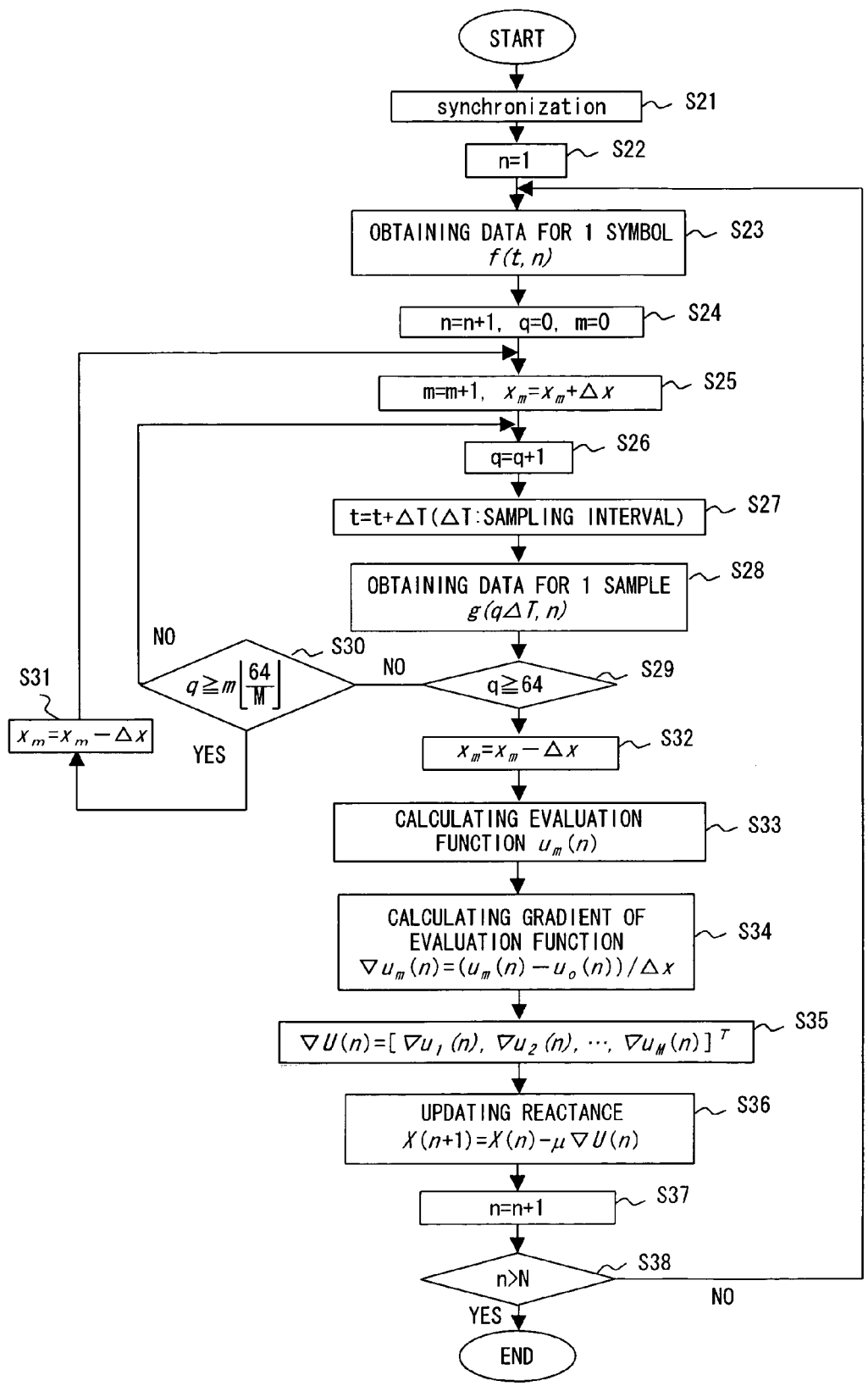
FIG. 12 is a flowchart of the reactance control process according to the second embodiment of the present invention.

FIG. 11 shows the perturbation system according to the second embodiment of the present invention. FIG. 12 is a flowchart of the reactance control process. According to the second embodiment, the perturbation of the no-feed antenna elements #1 through #6 is not repeated for 1 symbol with the element to be perturbed changed for each sample as in the first embodiment shown in FIG. 9, the elements are sequentially and continuously perturbed for all the possible number of samples, depending on the number of no-feed antenna elements and the number of samples in one symbol, equally assigned to each element in one symbol.

In the example shown in FIG. 11, 10 samples can be continuously perturbed per one element.

Since the process shown in FIG. 12 includes a number of steps similar to the process shown in FIG. 10, the portion different from those shown in FIG. 10 are explained below in detail. First, the processes in steps S21 through S23 are similar to those in step S1 through S3 shown in FIG. 10.

The value of n is incremented and the values q and m are initialized to 0 in step S24. The value of m is incremented and the reactance of the antenna element specified by m is perturbed in step S25. The value of q is incremented in step S26.

After data of one sample is obtained in steps S27 and S28 as in steps S7 and S8, it is determined in step S29 whether or not the value of q exceeds 64. The value of 64 is substantially the same as T/ΔT in step S10 shown in FIG. 10.

If it is determined that q has not reached 64, it is determined in step S30 whether or not the value of q is equal to or larger than the product obtained by multiplying m by the integer portion of the quotient obtained by dividing 64 by M. In the example shown in FIG. 11, since the integer portion of the value of the quotient is 10, and m is 1 for the first antenna element #1, the process from step S26 to step S30 is repeated until the relative position of the sample reaches 10.

When the determination result is YES in step S30, the variable reactance value is returned to the original value in step S31, the processes in and after steps S25 are repeated, and the data for the antenna elements of and after #2 is obtained in the procedure above. If it is determined in step S29 that the value of q has reached 64, then the value of Xm is returned to the original value in step S32, and control is passed to the process in step S33.

For the 61st through the 64th samples shown in FIG. 11, the value of m is 7 in step S25, the processes in steps S26 through S30 are repeated, it is finally determined that the value of q has reached 64 in step S29, the value of reactance is returned to the original value in step S32, and control is passed to step S33. In this case, the data obtained in step S28 for m=7 is not used in the subsequent processes, thereby causing no problems.

The processes from the calculation of an evaluation function to the update of reactance in steps S33 through S38 are the same as the processes in steps S12 through S17 shown in FIG. 10 according to the first embodiment, and the explanation is omitted here.

Figure 13:
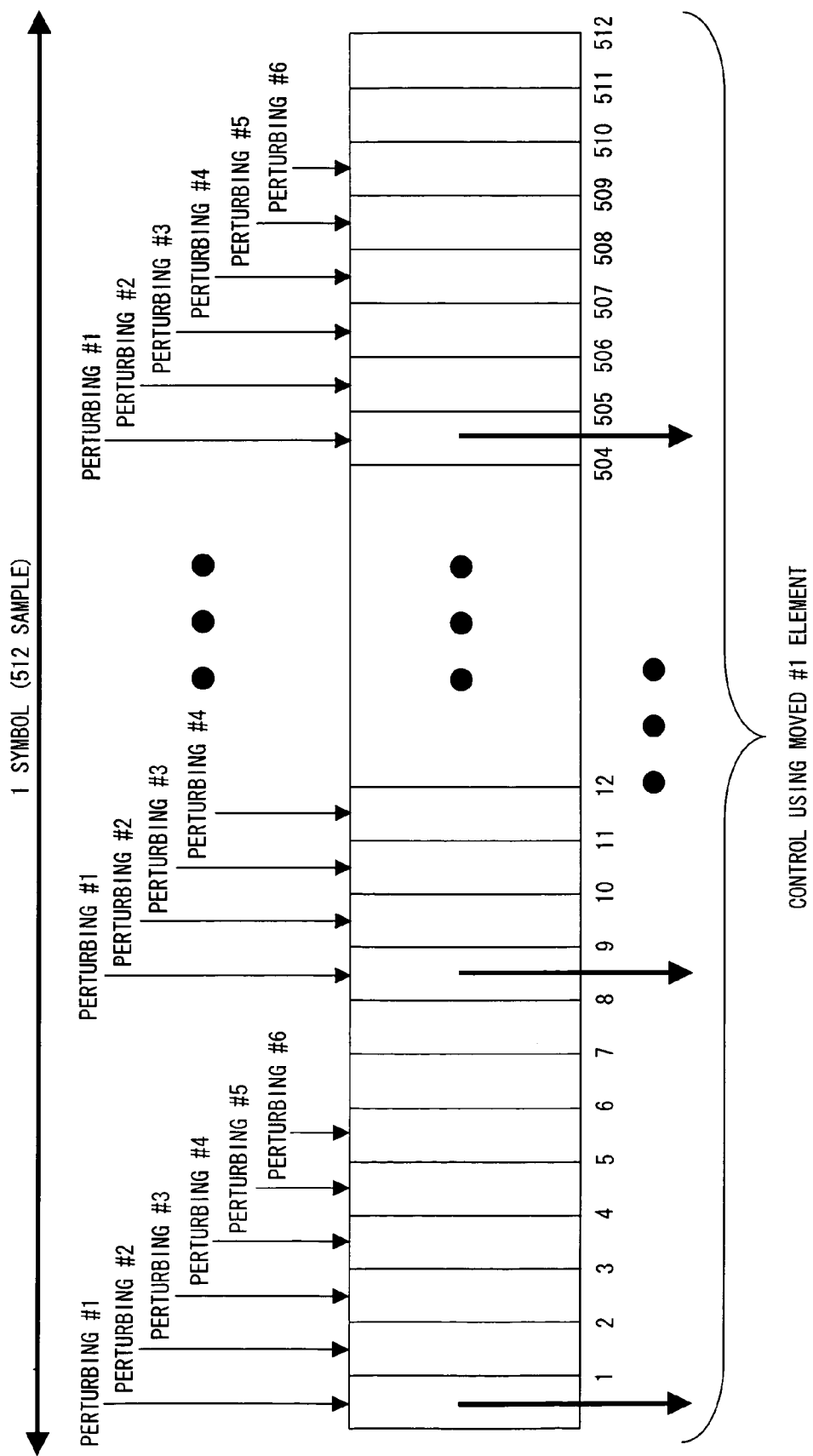
FIG. 13 shows the perturbation system according to the third embodiment of the present invention.
Figure 14:
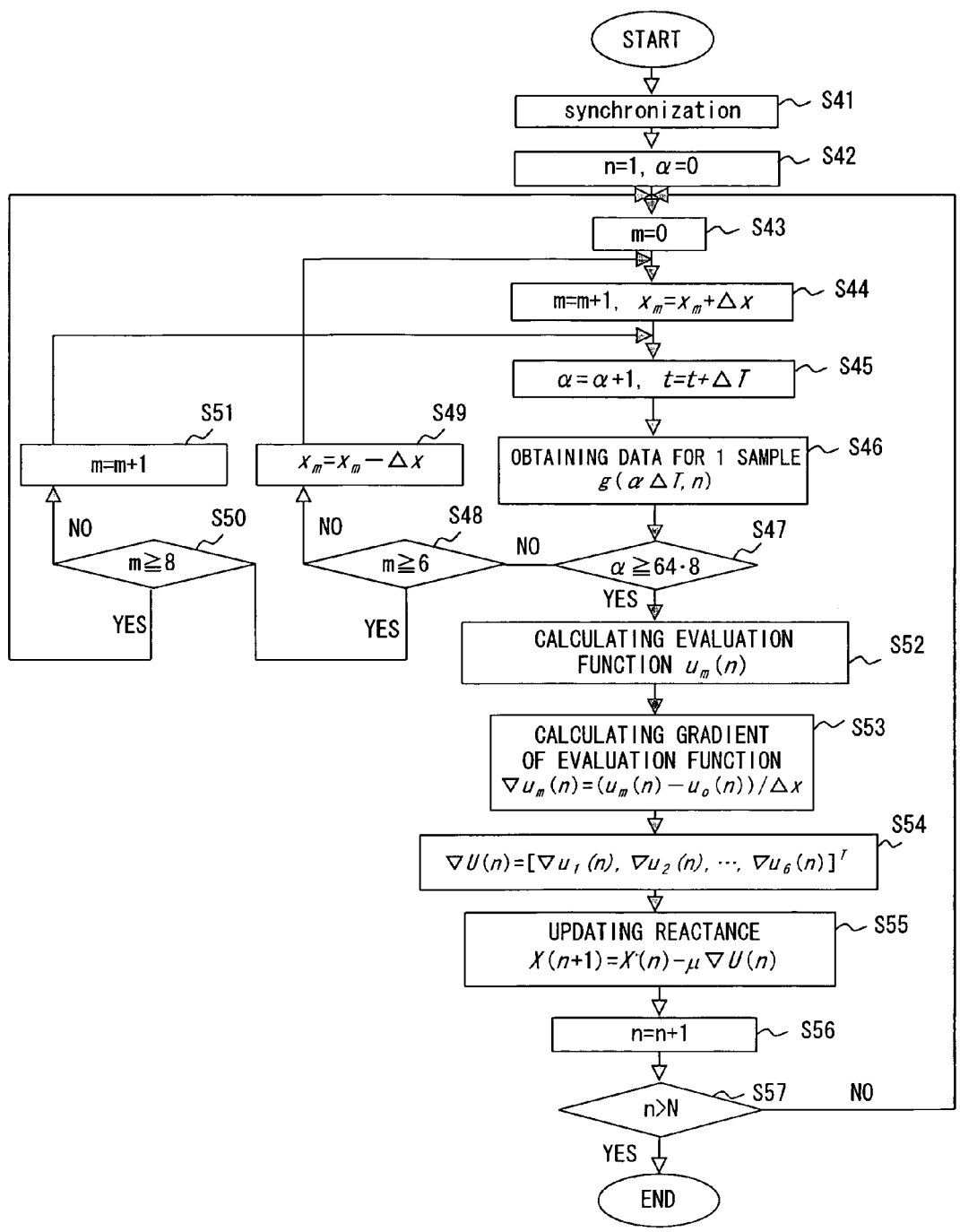
FIG. 14 is a flowchart of the reactance control process according to the third embodiment of the present invention.

FIG. 13 shows the perturbation system according to the second embodiment of the present invention. FIG. 14 is a flowchart of the reactance update process. In FIG. 13, eight-times over sampling is performed on 64 samples in one symbol, and 512 samples are obtained in one symbol. In an 8-sample unit, the perturbation of a variable reactance value is performed on the antenna elements #1 through #6 in the first six samples. In the last two samples, the variable reactance is not perturbed on any element. This process is repeated from the sample 1 to the sample 512.

When the process is started in FIG. 14, the synchronization is established in step S41, and the number n of trial processes is set to 1, and the value of α indicating the relative position of the sample in one symbol is initialized to 0 in step S42.

The value of m is incremented and the value of the reactance Xm is perturbed in step S44. The value of α is incremented and the value of time t is incremented by the sampling intervals ΔT in step S45. In step S46, the data of one sample is obtained. In step S47, it is determined whether or not the value of α has exceeded the final value.

If it has not reached the final value, then it is determined in step S48 whether or not the value of m is equal to or larger than 6. If it has not reached 6, then the reactance perturbing operation has not been completed on the first 6 samples of the perturbing operation in the 8-sample unit shown in FIG. 18. Therefore, after the value of the reactance is returned to the original value in step S49, the processes in and after step S44 are repeated.

If it is determined that the value of m is equal to 6, then it is assumed that the operation of practically perturbing reactance of the 8-sample unit perturbing operations has completed. Therefore, it is determined in step S50 whether or not the value of m is equal to or larger than 8, which is required in performing the process on the remaining two samples in the 8-sample unit. If it has not reached 8, then the value of m is incremented in step S51, and the processes in and after step S45 are repeated. When it is determined that the value of m is equal to 8, the value of m is set to 0 in step S43, and the process corresponding to the next eight samples is repeated.

If it is determined in step S47 that α has reached the final value, the process from the calculation of an evaluation function to the update of reactance is performed in steps S52 through S57 as in the first and second embodiments. However, in the calculation of the evaluation function, the calculation is performed using the data obtained by perturbing the value of variable reactance corresponding to an antenna element. For example, in the calculation of the evaluation function $u_1(n)$, the calculation is performed using the data obtained when the antenna element #1 is perturbed.

That is, in FIG. 13, the calculation of $u_1(n)$ is performed using the data obtained in the first sample, the ninth sample, ... Similarly, in the calculation of $u_2(n)$, the calculation is performed using the data obtained in the second sample, the tenth sample, ... The subsequent calculation is similarly performed, and the following equation is used when $u_0(n)$ is calculated to calculate the evaluation function $u_m(n)$ and the gradient. In the calculation of $u_0(n)$, the data of no perturbation of variable reactance of any antenna element in the eighth, the sixteenth, ... is used.

$$u_m(n) = \sum_{\alpha=1}^{64} g((8\alpha - 8 + m)\Delta T, n)e^{\frac{-j2\pi f_v \alpha}{64}}, \quad \text{[equation 8]}$$

$$(m = 1, 2, \ldots, 6)$$

$$u_0(n) = \sum_{\alpha=1}^{64} g(8\alpha\Delta T, n)e^{\frac{-j2\pi f_v \alpha}{64}} \quad \text{[equation 9]}$$

In the third embodiment, the reactance update process is completed in only one symbol while the reactance update process is performed in a two-symbol unit according to the first and second embodiments, and the process terminates when the number n of trial processes exceeds the maximum number N in step S57 shown in FIG. 14.

Figure 15:
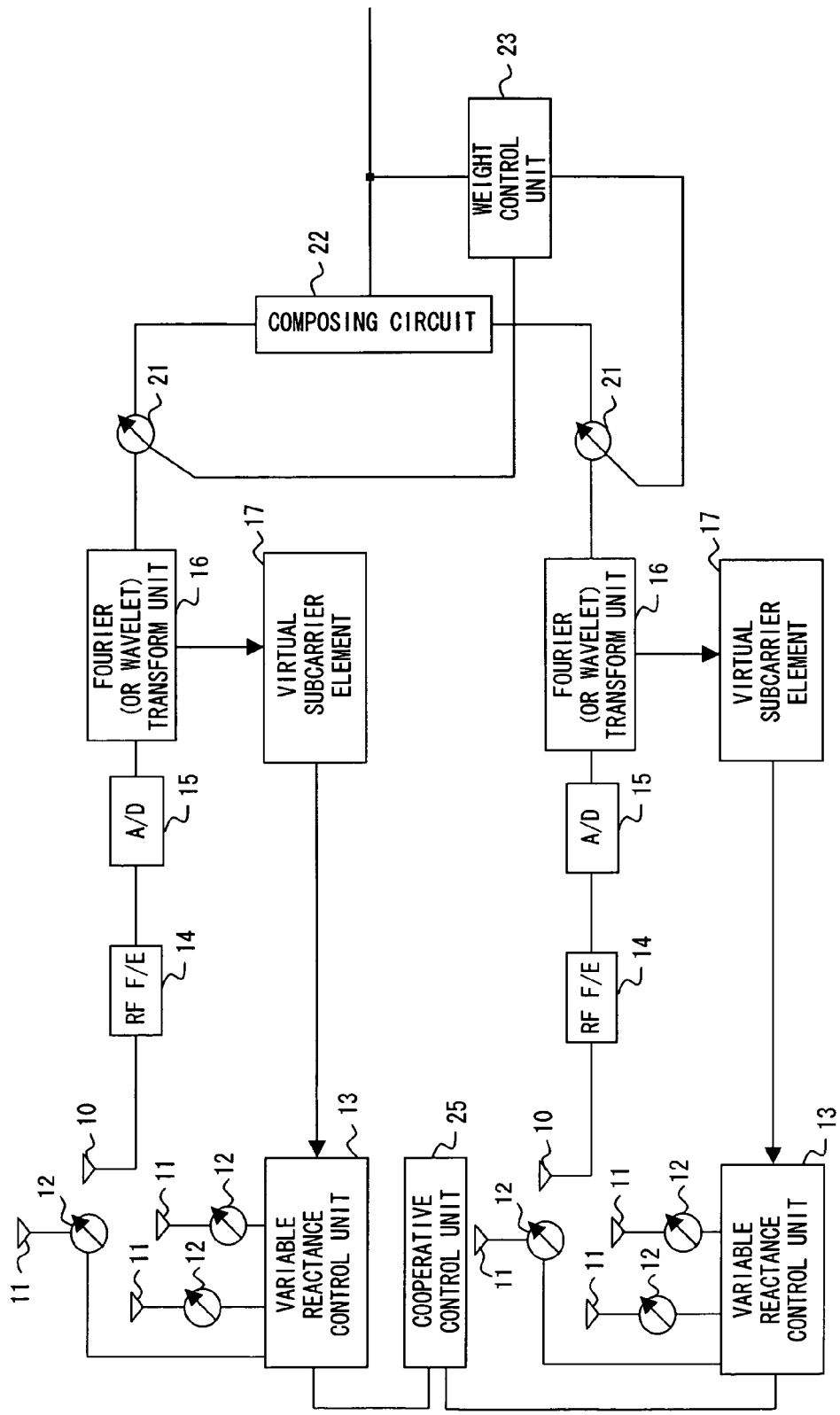
FIG. 15 is a block diagram of an example of the configuration of the diversity branch system.

FIG. 15 is a block diagram of the configuration of the diversity branch system applied to any of the first through third embodiments. In FIG. 15, using the feed antenna element 10 through the Fourier transform unit 16 shown in FIG. 7, plural sets, that is, two sets in this example, are used in controlling the variable reactance connected to the no-feed antenna element 11 by the variable reactance control unit 13 by extracting the virtual subcarrier element 17. The output of each Fourier transform unit 16 is composed by a composing circuit 22 through a weight unit 21. The weight value by the weight unit 21 is controlled by a weight control unit 23.

The interval of the antenna unit for each branch is set to a value too larger than the wavelength λ so that the fading correlation, that is, the correlation between the reception characteristics of the antenna units, can be small enough. Normally, the weight value is controlled by the weight control unit 23 such that the output of a branch having desired reception status in the output of each branch is highly evaluated.

The control of the variable reactance in each branch shown in FIG. 15 can be performed by each branch, or by a plurality of cooperative branches.

A cooperative control unit 25 controls a cooperative operation.

FIG. 16 is a flowchart of the process performed by the cooperative control unit 25. In this cooperative operation, the variable reactance control unit 13 of each branch independently performs the processes up to the calculation of an evaluation function. For example, as shown in FIG. 10 according to the first embodiment, it performs the processes up to step S12, and outputs a calculated element to the cooperative control unit 25.

The cooperative control unit 25 receives an evaluation function from each branch in step S61, obtains an average value of received evaluation functions for each value of m in step S62, and provides an obtained average value as a new evaluation function for the variable reactance control unit 13 of each branch, thereby terminating the process in step S63. Using the new evaluation function, each branch performs the processes, for example, from the calculation of gradient to the update of reactance in steps S13 through S15 shown in FIG. 10.

In the explanation above, the embodiment according to the present invention in which a variable reactance value for a no-feed antenna element is controlled to suppress an interference wave element is described. However, it is obvious that the present invention can also be applied to the system of suppressing the interference wave element by perturbing the weight value of the weight unit corresponding to each antenna unit.

Furthermore, the case in which the variable reactance values corresponding to six no-feed antenna elements are all perturbed is explained above. However, when, for example, the influence of the perturbation of a specific element is evaluated, the variable reactance values corresponding to other elements can be set to the maximum value, the load impedance for the specific element is increased so that the influence on other elements can be removed, and the effect of suppressing the interference wave element by the perturbation of the specific element can be checked.

As described above in detail, according to the embodiments of the present invention, by perturbing the variable reactance for an antenna element or a weight value in one symbol, the process of controlling an adaptive antenna can be quickly performed, and the interference suppressing algorithm can be quickly converged. Additionally, by performing adaptive control of the antenna unit in the high frequency unit, a circuit can be realized as a small, light, low power consumption, and low cost circuit, and can realize high-speed adaptive control, suppress the interference wave element of other systems as well as the interference wave element of its own communications system, thereby largely contributing to the realization of a practical wireless communications system in the OFDM system.

The present invention can be embodied by various combinations and variations of the above-mentioned embodiments without deviating from the spirit or major features of the present invention. Therefore, the above-mentioned embodiments are only examples and the present invention is not limited to the embodiments. The scope of the present invention is represented by the scope of the claims for the patent, and is not restricted by the specifications of the present invention. Furthermore, the variations and amendments belonging to the scope of the claims for the patent are included in the scope of the present invention.

What is claimed is:

1. A wireless-communication apparatus comprising a feed antenna element, a plurality of no-feed antenna elements, and a plurality of variable reactance units respectively connected to the plurality of no-feed antenna elements, and controlling directivity of an antenna by adjusting the plurality of variable reactance units, comprising:
   an adjustment unit performing perturbation control so that each period to temporarily change reactance of each of the plurality of variable reactance units is shorter than a period in which the perturbation control is not performed for any of the plurality of variable reactance units,
   wherein the wireless-communication apparatus controls the directivity of the antenna on the basis of received signals respectively received in the period in which the perturbation control is not performed for any of the plurality of variable reactance units and a period in which the perturbation control provides perturbation.

2. The wireless-communication apparatus according to claim 1, wherein
   the period in which the perturbation control is not performed for any of the plurality of variable reactance units corresponds to one symbol time.

3. The wireless-communication apparatus according to claim 1, wherein
   time required to provide perturbation in turn for all of the plurality of variable reactance units falls within one symbol time.

4. A wireless-communication method implemented in an apparatus comprising a feed antenna element, a plurality of no-feed antenna elements, and a plurality of variable reactance units respectively connected to the plurality of no-feed antenna elements, and controlling directivity of an antenna by adjusting the plurality of variable reactance units, said method comprising:
   performing perturbation control so that each period to temporarily change reactance of each of the plurality of variable reactance units is shorter than a period in which the perturbation control is not performed for any of the plurality of variable reactance units,
   wherein the apparatus controls the directivity of the antenna on the basis of received signals respectively received in the period in which the perturbation control is not performed for any of the plurality of variable reactance units and a period in which the perturbation control provides perturbation.

5. The wireless-communication method according to claim 4, wherein
   the period in which the perturbation control is not performed for any of the plurality of variable reactance units corresponds to one symbol time.

6. The wireless-communication method according to claim 4, wherein
   time required to provide perturbation in turn for all of the plurality of variable reactance units falls within one symbol time.

* * * * *